United States Patent [19]

Angello et al.

[11] Patent Number: 4,580,277
[45] Date of Patent: Apr. 1, 1986

[54] DIGITAL-BASED PHASE SHIFT KEYING MODULATOR

[76] Inventors: Paul S. Angello, 3119 SW. Second Ave., Portland, Oreg. 97201; George S. Des Brisay, Jr., 2906 Oakwood La., Torrance, Calif. 90505

[21] Appl. No.: 588,601

[22] Filed: Mar. 12, 1984

[51] Int. Cl.[4] .................. H03K 7/06; H04L 27/20
[52] U.S. Cl. .................. 375/67; 332/9 R; 332/16 R; 375/56
[58] Field of Search .................. 375/52, 56, 67, 84, 375/85; 332/9 R, 11 R, 16 R, 23; 329/104, 105, 110, 126; 328/24, 55; 307/262

[56] References Cited

U.S. PATENT DOCUMENTS

4,417,219 11/1983 Brossard et al. .................. 332/23 R
4,504,802 3/1985 Heatherington .................. 332/9 R
4,511,862 4/1985 Motiwala et al. .................. 332/16 R

*Primary Examiner*—Benedict V. Safourek

[57] ABSTRACT

A digital-based phase shift keying modulating device is disclosed. A phase code command signal is applied to an exemplary bi-phase shift keying modulating (BPSK) device designed in accordance with the present invention to phase reverse by 180° the output signal produced by the device. The exemplary BPSK modulating device is capable of producing an output signal of either triangular or sinusoidal shape. A preferred embodiment of the exemplary device is implemented by using a single exclusive OR logic gate in conjunction with a frequency synthesizer, which is comprised of an accumulator, an output register, and a group of exclusive OR logic gates. The modulator device has a variety of applications in digital communication systems such as, for example, ground-based and spacecraft communication systems. The disclosed BPSK modulating device is particularly useful in spacecraft data link communications systems wherein weight, volume, and power consumption are at a premium.

10 Claims, 26 Drawing Figures

DIGITAL-BASED PHASE SHIFT KEYING MODULATOR

BACKGROUND OF THE INVENTION

1. Field of the Invention

This invention relates to digital data communication modulator systems, and more specifically, to phase shift keying modulator devices employed in digital data link communication systems.

2. Description of the Prior Art

Digital communication systems typically transmit information by altering the phase angle of a periodic carrier signal waveform upon command by way of a data modulation or phase code command signal. Oftentimes the phase angle alteration is required to be 180°, or a phase reversal of one-half of a cycle of the periodic waveform. In a digital communication system, phase angle reversal is sometimes employed in conjunction with carrier signal frequency hopping, which is the rapid electronic sequencing through a plurality of predesignated carrier signal frequencies at the output of the communication system. The communication system employing frequency hopping transmits each carrier signal frequency for a prearranged period of time. The signal frequency hopping technique is typically employed in spread spectrum communication systems, which are less susceptible to errors caused by the imposition of jamming signals.

An electronic frequency synthesizer is normally used to accomplish such carrier signal frequency hopping. During the time it appears at the system output, each one of the predesignated carrier signal frequencies is bi-phase modulated by means of the introduction of a 180° shift in phase of the carrier signal. Such 180° signal phase shifting is generally accomplished by a bi-phase signal modulator which responds to a change in phase code states of a phase code command signal. In this manner, a digital communications system provides several channels of communication. Each one of the communication channels is associated with a different carrier signal frequency, and information of a digital nature is transmitted and received by altering the phase of the carrier signal by bi-phase modulation. Digital communication is thereby made available for many different communication channels using one set of equipment. This method of bi-phase shift keying (BPSK) modulation is a favored digital communication modulation format in the relevant art.

BPSK modulation is employed both in spacecraft, such as a satellite, and in ground-based digital communication systems which comprise data links that transmit information from one station to another. In particular, for spacecraft communications applications, the size, weight, and power consumption of BPSK modulator devices are extremely important parameters. BPSK modulators are also used to secure transmitted information so that such information content cannot be readily detected.

A conventional BPSK modulator in the prior art has heretofore been designed and built in electronic units using a frequency synthesizer, electronic driver, balanced mixer, and amplifier. A modulator unit of this type, which is depicted in FIG. 1A, requires the use of relatively expensive and complex electronic components.

Figure 1A:
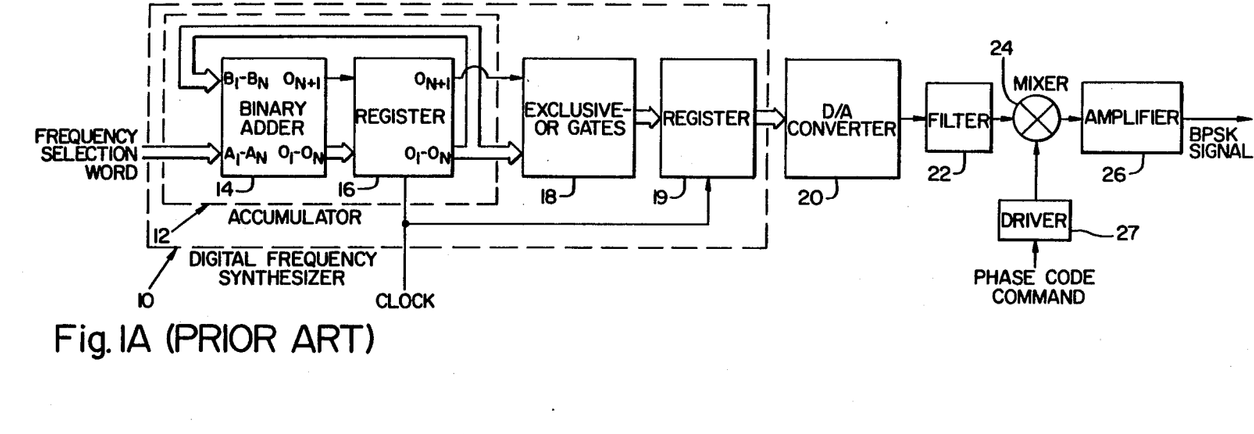
FIG. 1A is a block diagram of a BPSK modulating device in accordance with the teachings of the prior art.

The modulator unit shown in FIG. 1A includes digital frequency synthesizer 10 which is a type of electronic frequency synthesizer that provides a repetitive series of digital words of alternating first and second sequences. The first sequence comprises a series of digital words increasing in value to some predesignated maximum value, and the second sequence comprises a series of digital words decreasing in value to some minimum value. The signal developed at the frequency synthesizer output is a series of digital words which characterize a periodic triangular waveform.

With reference to FIG. 1A, digital frequency synthesizer 10 is designed in accordance with the teachings of the prior art and comprises binary accumulator 12 which includes binary adder 14 and delay register 16. Binary adder 14 has two sets of inputs, each having N parallel conductors to which digital words are applied. The input conductors denominated $A_1-A_N$ receive an externally applied frequency selection digital word which corresponds to the desired fundamental frequency of the synthesizer output signal. The input conductors denominated $B_1-B_N$ receive from the output of register 16 the digital words appearing at the output conductors of binary adder 14; therefore, the frequency selection word applied to input conductors $A_1-A_N$ is successively added by binary adder 14 to its then-existing contents.

Register 16 comprises N+1 number of D flip flops of which N number receive at their D inputs a serial stream of digital words appearing on N number of parallel output conductors denominated $O_1-O_N$ of binary adder 14. Register 16 is interposed between output conductors $O_1-O_N$ and input conductors $B_1-B_N$ of binary adder 14 so that the digital words appearing at output conductors $O_1-O_N$ are applied to the $B_1-B_N$ input conductors at a rate equal to frequency $f_C$ of the clock signal which is applied to the clock inputs of the D flip flops.

For a binary accumulator 14 with N stages, the most significant bit (MSB) corresponds to a phase of $2\pi/2^1$ radians, the least significant bit (LSB) corresponds to a phase of $2\pi/2^N$ radians, and overflow occurs at $2\pi$ radians. Since the angular frequency (i.e., the rate of phase change) $\omega = d\theta/dt = \Delta\theta_{step}/T$, where $T = 1/f_C$, the output signal frequency can be expressed in terms of the input digital word as $Mf_C/2^{N+1}$, where M is the decimal equivalent of the frequency selection word applied to input conductors $A_1-A_N$. The synthesizer output signal frequency is determined, therefore, by the accumulator size, clock frequency, and input word.

When incremented by its LSB, binary accumulator 12 develops at its output a series of digital words representing a sawtooth waveform. The accumulator output has an extra bit denominated $O_{N+1}$ which provides a signal that changes logic state each time the accumulator overflows. This overflow signal is applied to the D input of the N+1 D flip flop in, and is clocked to the output of, register 16 at a rate equal to $f_C$. The overflow signal which appears at the output of register 16 is applied to an input of each one of N number of exclusive OR gates included in circuit 18. A different output conductor of register 16 is applied to a second input of each one of the exclusive OR gates in circuit 18. When in the logic 1 state, the overflow signal effectively causes the digital words appearing at the output of frequency synthesizer 10 to represent the successive subtraction of the frequency selection word from the accumulator contents. The result is a serial sequence of digital words which characterize a triangular waveform at the output of circuit 18.

Output register 19 transfers the words in the series to the synthesizer output at a rate equal to the clock frequency $f_C$. Each word in the series which appears at the output of digital frequency synthesizer 10 corresponds to the accumulator contents at a given time. The adjacent digital words in the series appearing at the output of register 16, therefore, generally differ by a constant value equal to the frequency selection word. (The difference value computed from the digital word appearing at the accumulator output after overflow can be an exception to this relationship.)

Since the frequency $f_C$ of the clock signal applied to register 16 and the number N of stages of binary accumulator 2 generally remain constant, the fundamental frequency of the output signal is tuned by changing the value M of the frequency selection digital word applied to input conductors $A_1$-$A_N$ of binary adder 14. The fundamental frequency of the output signal depends upon the successive addition in accumulator 12 of an input word having a value M; therefore, an output signal with a higher fundamental frequency is obtained by increasing the value of M.

It is a known property of the digital frequency synthesizer described hereinabove that continuous-phase tuning to different output frequencies is accomplished when the value of M is changed. This property is especially desirable in applications such as, for example, simulating the creation of Doppler frequencies caused by the relative motion between a satellite transmitter and a relay satellite receiver in asynchronous orbits.

The series of digital words appearing at the output of the digital frequency synthesizer 10 is applied to a digital-to-analog (D/A) converter 20 in order to obtain a continuous-wave analog signal having a triangular waveform characteristic. To develop from the output of a digital frequency synthesizer a carrier signal which comprises fewer harmonic frequency components, the signal having a triangular waveform characteristic may be converted into a sinusoidal analog waveform in accordance with either one of two methods.

In the first method, a series of digital words representing a triangular wave is applied to a digital memory device (not shown) having inscribed therein values corresponding to a sinusoidal function. The memory device is positioned between register 19 and D/A converter 20. The output of the memory device is applied to the input of digital-to-analog converter 20 to provide an approximation to a sine wave analog signal. An electronic filtering device 22 positioned at the output of D/A converter 20 further eliminates harmonic frequency components in the analog output signal.

In the second method, a triangular wave in analog form is applied direct from D/A converter 20 to electronic filtering device 22 to eliminate substantially all frequencies but the fundamental frequency component to provide a sine wave at the fundamental frequency.

The sinusoidal analog signal is applied to an input of an electronic balanced mixer 24, the output of which is applied to electronic amplifier 26 to increase the amplitude of the bi-phase modulated signal. The analog signal appears at the output of amplifier 26 as a sinusoidal waveform with a particular amplitude, period, and phase.

An electronic driver 27 supplies a controlled balanced current to balanced mixer 24, which is used as a signal modulator to vary the phase angle of the sinusoidal carrier signal applied to balanced mixer 24 from frequency synthesizer 10. The phase angle characteristic of the carrier signal is governed by an input signal to electronic driver 27, which is referred to as the phase code command signal. The phase code command signal has first and second voltages which correspond to different phase code states, the first state producing at the output of the BPSK modulator device a carrier signal which differs in phase angle by 180° from that produced by the second state. A change in the state of the phase code command input signal will command a phase angle reversal by 180° of the carrier signal appearing at the output of the BPSK modulation device.

SUMMARY OF THE INVENTION

The advantage of the present invention in relation to prior art devices is that the present invention provides the capability of phase angle modulation between discrete phase states of a signal with a triangular or sinusoidal waveform with the use of only a digital frequency synthesizer and additional logic circuitry, thereby eliminating the need for an electronic driver, a balanced mixer, and an amplifier. In a preferred embodiment of an exemplary modulating device of the present invention, BPSK modulation is accomplished with the use of a digital frequency synthesizer and only one other simple, relatively inexpensive electronic logic element, an exclusive OR logic gate.

The digital frequency synthesizer is comprised of an electronic accumulator which provides a means for producing a series of digital words characterizing a signal with a sawtooth waveform. The series is produced by sequentially adding to the accumulator contents the value of an applied frequency selection digital signal of constant value until a predetermined maximum value is exceeded. The accumulator overflows and continues the sequential addition process. An overflow signal generated by the accumulator and an externally generated phase code command signal are applied to different inputs of a single exclusive OR logic gate whose output is applied to an input of each one of a plurality of exclusive OR logic gates within the frequency synthesizer. Each one of the plurality of exclusive OR gates receives at its other input a different signal conductor from the output of the accumulator. The resultant plurality of signals appearing at the outputs of the plurality of exclusive OR logic gates are thereafter applied to an output register. The contents of the output register are presented at its output at a rate established by the frequency of an externally generated clock signal.

The resultant signal is a first series of digital words characterizing a first signal having a triangular waveform characteristic. This signal may be transformed by means of an electronic filter into a signal with sinusoidal characteristics. The frequency of the triangular or sinusoidal waveform depends upon the value of the frequency selection digital word applied to the frequency synthesizer, and the phase angle of the triangular or sinusoidal waveform can be reversed by 180°, or one-half of a waveform cycle, by changing the phase code logic states of the applied phase code command signal.

During a given counting cycle of the accumulator, the adjacent words of the first series of digital words appearing at the accumulator output differ by a constant value equal to the digital word applied to the frequency synthesizer. By means of a transition between phase code states of the phase code command signal, the difference value between adjacent words, which originally appear at the accumulator output, is changed or offset by a certain value to provide a second series of digital words which characterize a second signal waveform having the same fundamental frequency as but a discrete shift in phase relative to that of the first signal. In the preferred embodiment, the use of the exclusive OR gate to which the phase code command signal is applied accomplishes a one's complement logic operation on the digital word appearing at the output of the digital frequency synthesizer whenever the phase code command signal is in the logic 1 state. This introduces a change in the difference value to provide a 180° phase shift.

A significant advantage of the present invention is the ability to use the same BPSK modulator hardware to accomplish frequency shift keying (FSK), quadriphase shift keying (QPSK), and minimum shift keying (MSK) signal modulation. FSK modulation is accomplished by maintaining the phase code command signal in one phase code state and changing the frequency selection digital word applied to the input of the digital frequency synthesizer to produce signals of different frequencies at the output of the frequency synthesizer. QPSK modulation and MSK modulation require two BPSK modulators of the type described herein. The outputs of the BPSK modulators are phased and summed in accordance with their respective signal processing techniques to obtain the desired QPSK and MSK signal outputs.

Digital communication systems typically employ a combination of different modulation formats. The present invention allows such systems to be designed using only one type of modulator hardware to accomplish each modulation technique. In addition, the fine tuning capability of the digital frequency synthesizer incorporated in the modulator of the present invention facilitates the design of communication channels which employ BPSK, QPSK, MSK, and/or FSK signal modulation in a nonuniform channel spacing arrangement. This promotes the efficient use of the communication system bandwidth and substantially reduces the amount of hardware required to modulate the carrier signals. It is also apparent that the modulator of the present invention is fully integrated and compatible with a communication system which employs frequency hopping. The use of the BPSK modulator of the present invention represents, therefore, a further saving in power consumption and costly hardware in such modulation systems.

Accordingly, it is a general object of the present invention to accomplish phase angle modulation of an output signal developed by a digital frequency synthesizer.

Another object of the invention is to provide bi-phase shift keying modulation of a carrier signal having a commonly required waveform, namely a triangular or sinusoidal waveform.

A further object of the invention is to provide BPSK modulation using only a frequency synthesizer and an exclusive OR logic gate in a relatively inexpensive and reliable fashion.

Still another object of the invention is to provide BPSK modulation in systems wherein space, weight, and the power consumption are at a premium.

Yet another object of the invention is to provide communication system BPSK modulation hardware which can also be easily adapted for use in accomplishing FSK, QPSK, and MSK signal modulation.

BRIEF DESCRIPTION OF THE DRAWINGS

The following specification and the accompanying drawings describe and illustrate an exemplification of the present invention. A complete understanding of the invention, including the novel features and purpose thereof, will be provided by consideration of the specification and drawings.

FIGS. 4a and b are a graphic representation of typical waveforms depicting the signal applied to the frequency synthesizer and the resulting triangular waveform for the two states of applied phase code command signal;

FIGS. 5a–5g are a graphic representation of typical waveforms at significant points of reference in the schematic diagram of FIG. 3, with the state of the applied phase code command signal being "zero";

FIGS. 6a–6g are a graphic representation of typical waveforms at significant points of reference in the schematic diagram of FIG. 3, with the state of the applied phase code command signal being "one";

FIGS. 7a–7e are a graphic representation of typical waveforms at significant points of reference in the schematic diagram of FIG. 3, with the state of the applied phase code command signal alternating between "one" and "zero"

DESCRIPTION OF THE PREFERRED EMBODIMENT

Figure 1B:
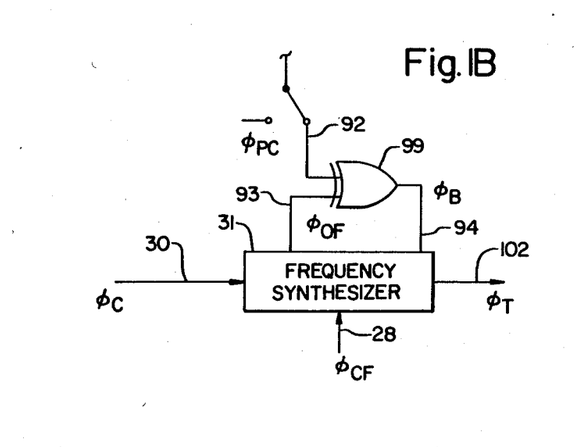
FIG. 1B is a simplified block diagram of a BPSK modulating device in accordance with the teachings of the present invention.

The present invention is depicted in FIG. IB. A positive, discrete, digital signal of constant value $\phi_C$ is applied to digital bus input connector 30 of frequency synthesizer 31. In response to the applied signal $\phi_C$, frequency synthesizer 31 produces a digital signal $\phi_T$ with triangular waveform characteristic by employing an accumulation process.

In order to accomplish phase modulation, that is, the variation of the phase angle of the digital signal $\phi_T$ with triangular waveform characteristic, in accordance with the present invention, exclusive OR logic gate 99 is coupled to frequency synthesizer 31. A two-state phase code command signal $\phi_{PC}$ is applied to input terminal 92 of exclusive OR logic gate 99. The selected state of the phase code command signal determines the relative phase angle relationship of the digital signal $\phi_T$ with triangular waveform characteristic at digital bus output connector 102. With the phase code command signal being set to the "one" state, the triangular waveform is phase reversed by 180° relative to the angular phase of the triangular waveform when the phase code command signal is set to the "zero" state. An overflow signal $\phi_{OF}$ is also applied to exclusive OR logic gate 99 at input terminal 93. In response to the two signals applied respectively at input terminals 92 and 93, exclusive OR logic gate 99 provides a signal $\phi_B$ which is applied by lead 94 to frequency synthesizer 31 to effect the hereinabove described phase modulation of the digital signal $\phi_T$ with triangular waveform characteristic at output 102.

Figure 2:
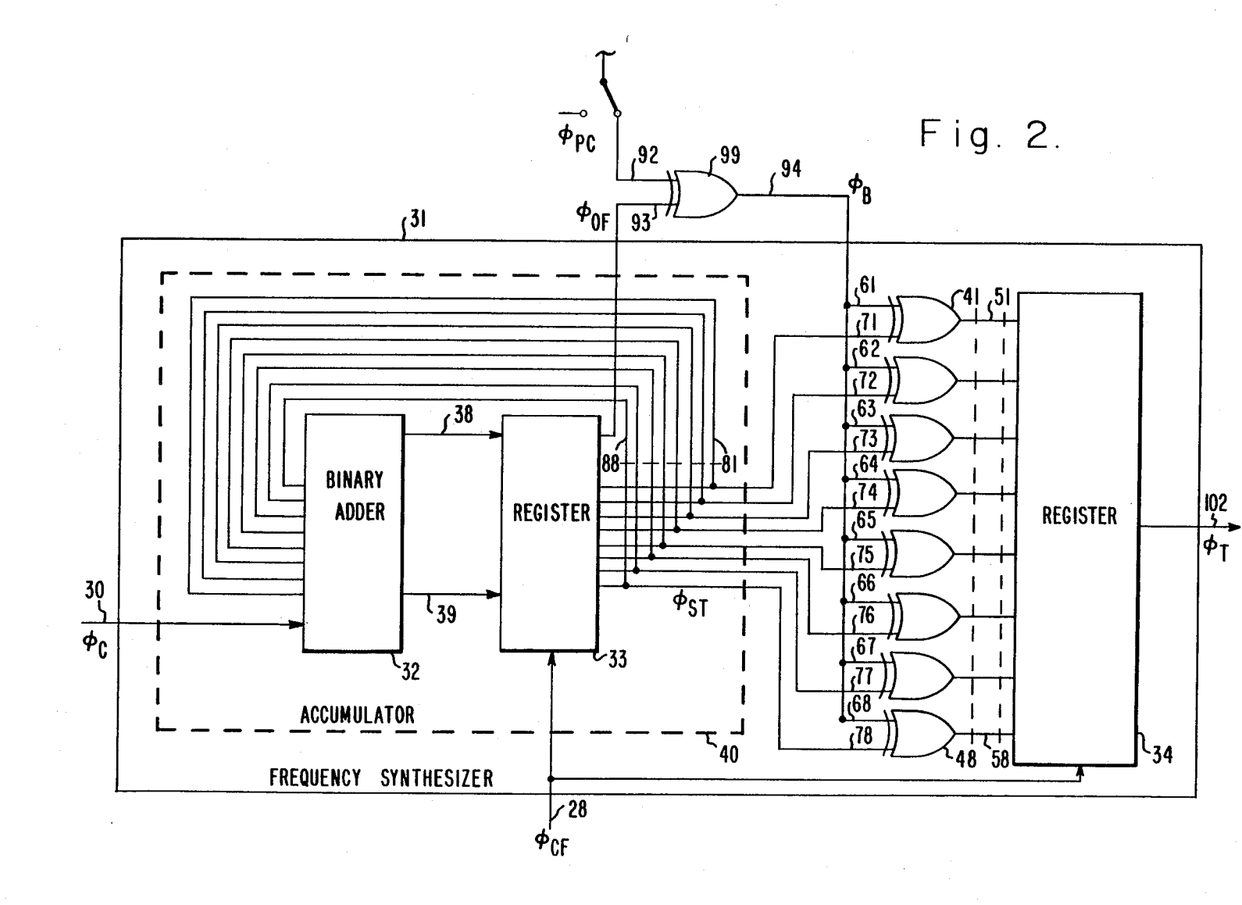
FIG. 2 is a schematic diagram of a preferred embodiment BPSK modulating device in accordance with the teachings of the present invention.

A mechanization of the present invention is illustrated in the schematic diagram of FIG. 2 wherein the coupling of exclusive OR logic gate 99 to frequency synthesizer 31 is depicted in detail. Frequency synthesizer 31 is composed of accumulator 40, output register 34, and a plurality of exclusive OR logic gates 41, 42, 43, 44, 45, 46, 47, and 48, generally totaling M in number, wherein the number M depends upon use of the present invention in any particular application. Accumulator 40 consists of binary adder 32 and register 33. The referenced electronic components can be commercially obtained in the art as follows:

| Electronic Component | Commercial Part Description |
| --- | --- |
| Register (33) | Hex D Flip Flop, Type 54LS378 or Quad D Flip Flop, Type 54LS379 |
| Output Register (34) | |
| Binary Adder (32) | Type 54LS283 (4 bit) |
| Exclusive OR Logic Gates (41–48) | Quad XORS, Type 54LS86 |
| Exclusive OR Logic Gate (99) | |

Discrete, digital signal $\phi_C$ of constant value C, wherein the value of C is associated with a desired fundamental frequency of output signal $\phi_T$, is applied to frequency synthesizer 31 at input connector 30, and thereafter to binary adder 32 of accumulator 40. Signal $\phi_C$ is generally comprised of N bits of binary data, each bit having a logic value of zero or one. The maximum value C of the applied signal $\phi_C$ is equal to $2^N-1$; therefore, C can take on only discrete digital values which depend upon the significance or value of each one of the N bits of binary data. Signal $\phi_C$ is applied at digital bus input connector 30 at specific, evenly spaced, discrete time points, determined by the clock input data rate of frequency synthesizer 31, as controlled by clock frequency command signal $\phi_{CF}$, which is applied to frequency synthesizer 31 at input lead 28. At each point in time when signal $\phi_C$ is applied at input connector 30 to frequency synthesizer 31, binary adder 32 adds the value C to the then-existing accumulated sum of the values C of signal $\phi_C$.

A signal representing the value of the sum for a particular point in time is applied to register 33 on digital bus 39, which is comprised of N leads, where it is stored until the next signal representing the value of the sum is applied to register 33. The signal on digital bus 39 is composed of N bits of digital data, each bit having a value of 0 or 1. The signal on lead 38 is composed of one bit of digital data, having a value of 0 or 1. Whenever the value C in a counting period causes the sum to exceed a predesignated maximum value $(2^N-1)$ in binary adder 32, an overflow condition occurs. An overflow condition to which reference is made herein, therefore, applies to an accumulator having N output leads comprising digital bus 39. The sum in binary adder 32 in the next succeeding counting period is set to a value equal to the difference between value C and the amount required in the previous counting period to cause the sum to reach $2^N-1$. The summing process described hereinabove is continued thereafter.

Of the N bits of data comprising the signal on digital bus 39 from binary adder 32 to register 33, only M bits comprise the signal $\phi_{ST}$ output from register 33, and thus from accumulator 40, and thereafter applied to M exclusive OR logic gates of frequency synthesizer 31, wherein M is a positive integer number with value less than or equal to that of N, another positive integer number.

In particular, $\phi_{ST}$ is comprised of the M most significant binary bits of the N binary bits of the signal applied to register 33 on digital bus 39, wherein the M most significant binary bits are those M consecutive binary bits of the N bits comprising the signal applied on the leads of digital bus 39 to register 33. These M number of bits contribute most to the value of the signal applied to register 33 on the leads of digital bus 39. The M most significant bits of the N binary bit signal applied to register 33 on the leads of digital bus 39 therefore comprise the signal $\phi_{ST}$, with each one of M binary digital signals being applied to one of the input terminals of a different one of the M exclusive OR logic gates 41 through 48 of frequency synthesizer 31. Consequently, the signal output from accumulator 40 on leads 81, 82, 83, 84, 85, 86, 87, and 88, is a sequence of increasing digital values which can range from a minimum value of zero to a maximum value of $2^M-1$.

The signal output from register 33 on leads 81 through 88 is applied to binary adder 32 at the input terminals indicated in FIG. 2. This output signal consists of N bits of binary data, each bit having a 0 or 1 value. Although in FIG. 2, the output signal from register 33 is associated with eight leads 81 through 88, which is exactly the same number of leads, and in fact the same leads, associated with the $\phi_{ST}$ output from accumulator 40, in general, as it is well known in the art, there may be more leads, a total of N in number, output from register 33 and applied to binary adder 32 than there are leads, M in number, output from accumulator 40 and applied to the sequence of exclusive OR logic gates 41 through 48. Signal $\phi_{ST}$ output from accumulator 40 on leads 81 through 88 and applied to the sequence of exclusive OR logic gates 41 through 48, respectively, in general, consists of M binary bits, each bit having a value of zero or one, wherein the value of the number M is less than or equal to the value of the number N, where M represents the most significant bits (MSB's) of the N-bit binary signal on lead 39. In FIG. 2, along with the related discussion herein, M has a value equal to the value of N, which value is eight.

Each one of the leads 81, 82, 83, 84, 85, 86, 87, and 88 associated with signal $\phi_{ST}$ output from accumulator 40 is applied, respectively, to the input terminals 71, 72, 73, 74, 75, 76, 77, and 78 of exclusive OR logic gates 41, 42, 43, 44, 45, 46, 47, and 48, respectively. Coupled to each one of the respective input terminals 61, 62, 63, 64, 65, 66, 67, and 68 of these exclusive OR logic gates is output signal $\phi_B$ of exclusive OR gate 99 on output lead 94. Overflow signal $\phi_{OF}$ from register 33 is applied to input lead 93 and phase code command signal $\phi_{PC}$ is applied to input lead 92 of exclusive OR logic gate 99. The use of exclusive OR logic gate 99 in connection with exclusive OR logic gates 41 through 48 having output signals on, respectively, output leads 51, 52, 53, 54, 55, 56, 57, and 58 cause the transformation of the signal $\phi_{ST}$ appearing at the output of accumulator 40, which has a waveform of sawtooth characteristic, into a signal $\phi_T$ appearing at output 102 of register 34 with triangular waveform characteristic. The output 102 is a group of parallel conductors upon which a serial stream of digital words representing the signal $\phi_T$ of triangular waveform characteristic appears. The values of digital words in the series correspond to the fundamental frequency and phase of the signal $\phi_T$ as will be described hereinafter.

Phase angle modulation of the signal $\phi_T$ in accordance with the phase code command signal $\phi_{PC}$ is accomplished with the use of exclusive OR logic gate 99 and is described in detail with reference to FIGS. 3, 4, 5, 6, and 7.

Figure 3:
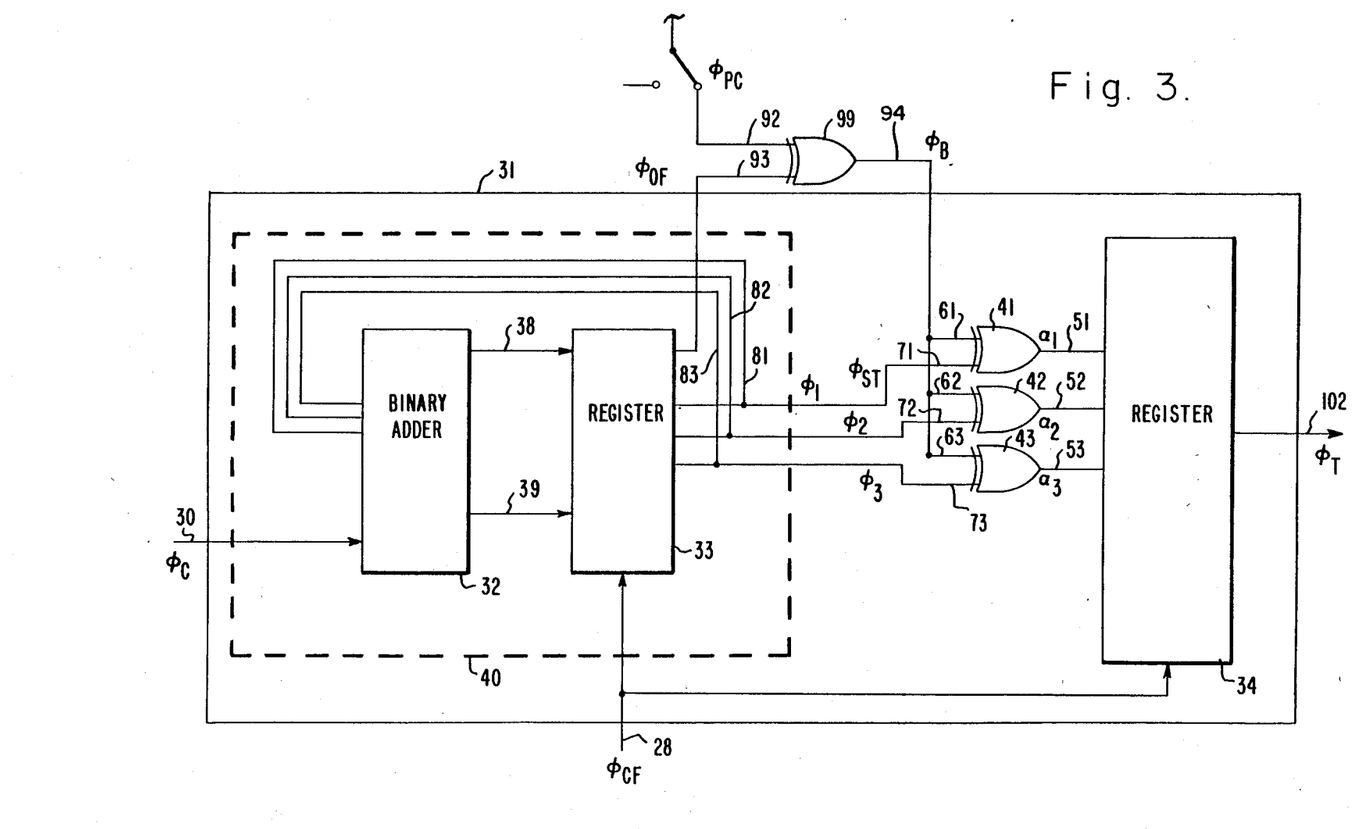
FIG. 3 is a schematic diagram indicating an illustrative embodiment of the BPSK modulating device depicted in FIG. 2 for the purpose of clarity in teaching the present invention.

FIG. 3 depicts a particular embodiment of the invention with the characteristics that M=N=3, being a more specific embodiment than that disclosed in FIG. 2, and presented herein for purposes of clarity of teaching the operation of the present invention. With this embodiment of the invention, the particulars of the operation of the BPSK modulator invention can be described clearly, yet in detail, and without loss of generality, since the same notions apply for more extensive embodiments of the invention.

FIGS. 4, 5, 6, and 7 are waveform representations of the signals at various significant points of reference in the invention. In particular, the waveforms associated with the following signals are depicted: input signal ($\phi_C$) applied to frequency synthesizer 31, a discrete, digital signal, depicted in FIG. 7b with constant value C=1; phase code command input signal ($\phi_{PC}$) applied to input terminal 92 of exclusive OR logic gate 99, a continuous signal with only two phase code states, said "zero" and "one" states being depicted in FIGS. 5g, 6g, and 7a with respective values of zero and one; discrete, digital signal ($\phi_{ST}$) with sawtooth waveform characteristic having amplitude A and period $T_M$, output from accumulator 40 on output leads 81, 82, and 83, depicted in FIGS. 4a, 5a, 6a, and 7c with an initial value of 0 and a predesignated maximum value, or amplitude A, of 7 (which is $2^M-1$, since M=3); and discrete, digital signal ($\phi_T$) with triangular waveform characteristic, having amplitude A and period $2T_M$, output from BPSK modulator device on output 102, depicted in FIGS. 4b, 5b, 6b, and 7d–7e with a minimum value of 0 and a maximum value of 7 (which is $2^M-1$, since M=3).

In operation, a discrete, digital signal $\phi_C$ of constant value C, such as the signal depicted in FIG. 7 as waveform 150 with C=1, is applied to digital bus input connector 30 of frequency synthesizer device 31, at discrete, evenly spaced, points in time. The time spacing of the input of signal $\phi_C$ is determined by the clock input data rate of frequency synthesizer 31, which is controlled by clock frequency command signal $\phi_{CF}$, applied to frequency synthesizer 31 at input lead terminal 28. Binary adder 32 adds the value C of signal $\phi_C$, at each point in time, to the prior accumulated sum of values, until a predesignated maximum value $2^N-1$ is reached; that is, for any discrete point i in time, the sum $S_i$ of constant value C of signal $\phi_C$ can be expressed as $$S_i = \sum_{i=0}^{T_M} C_i$$

where the value of $C_i$ is C at each discrete time point i, and there are a total of $T_M$ time points, where $T_M$ is equal to $2^N/C$, that occur prior to binary adder 32 reaching the predesignated maximum value $S_{MAX}=2^N-1$. A signal representing the value of the sum $S_i$ for a particular point i in time is applied to register 33 on digital bus 39, and the sum value, $S_i$, is stored until the next signal representation of the sum $S_i$ is applied to register 33.

In the next succeeding counting period after reaching a predesignated maximum value $S_{MAX}$ in binary adder 32, the sum $S_i$ in binary adder 32, is set to zero value, $S_i=0$, which is at the next succeeding discrete time point i, and the adding process is thereafter repeated in binary adder 32. A waveform representation of the signal $\phi_{ST}$, with waveform segments 160, 161, 164, and 165, which is comprised of binary, digital signals $\phi_1$, $\phi_2$, and $\phi_3$, is depicted in FIGS. 4, 5, 6, and 7, and therein characterized as a discrete, digital sawtooth waveform with an amplitude value A of $2^N-1$ and period of $T_M$ seconds. Signals $\phi_3$ and $\phi_1$ represent the most significant and least significant bits, respectively, of the digital words comprising signal $\phi_{ST}$.

The signal present at the output of accumulator 40, therefore, is a series of digital words which successively increase by the value of C=1. Except for the condition in which the contents exceed the predetermined accumulator capacity $S_{MAX}$ and thereby cause a repetition of the summing process from zero, the difference value between adjacent words in the series equals C. The difference value corresponds to the fundamental frequency of the synthesizer output signal $\phi_T$.

Overflow signal $\phi_{OF}$ appearing on output lead 93 of register 33 indicates when the sum $S_i$ associated with binary adder 32 adding process has reached a value of $2^N$, wherein an overflow condition has been reached in accumulator 40 in that the maximum value $2^N-1$ for an accumulator based upon N binary bits of information has been exceeded. Phase code command signal $\phi_{PC}$ is applied to input terminal 92 of exclusive OR logic gate 99 and has two phase code states, a "zero" state and a "one" state. The phase code command signal $\phi_{PC}$ is represented by the waveforms shown in FIGS. 5, 6, and 7. The phase relationship of the triangular waveforms associated with signal $\phi_T$ is commanded by the state of the phase code command signal $\phi_{PC}$, whereby the signal $\phi_T$ with triangular waveform characteristic is altered in phase by 180° when the state of the $\phi_{PC}$ signal is changed from "zero" state to the "one" state, and vice versa.

The signal $\phi_{ST}$ appearing at the output of register 33 on leads 81, 82, 83 is applied to exclusive OR logic gates 41, 42, and 43 on the respective input terminals 71, 72, and 73. Signal $\phi_{ST}$ is comprised of discrete, digital signals $\phi_1$, $\phi_2$, and $\phi_3$ on respective leads 81, 82, and 83, each of which signals is a binary signal having values of 0 or 1. The signal $\phi_B$ appearing at the output of exclusive OR logic gate 99 is coupled to the respective input terminals 61, 62, and 63 of exclusive OR logic gates 41, 42, and 43. The signals $\alpha_1$, $\alpha_2$, and $\alpha_3$ appearing at the outputs of exclusive OR logic gates 41, 42, and 43 on the respective leads 51, 52, and 53 are coupled to the inputs of register 34. Register 34 stores the respective signals appearing on leads 51, 52, and 53 and presents at its output 102 the signal $\phi_T$, which has the triangular waveform characteristic depicted in FIGS. 4, 5, 6, and 7 of the associated signal.

The following two tables represent, at specific instants i in time for the two phase code command signal $\phi_{PC}$ input states of "zero" (Table 1) and "one" (Table 2), the values associated with the signal $\phi_C$ applied to the BPSK modulating device, for constant value C=1; an exemplary phase code command signal $\phi_{PC}$ applied to input lead 92 of exclusive OR logic gate 99; overflow signal $\phi_{OF}$ delivered from register 33 to input lead 93 of exclusive OR logic gate 99; the signals $\phi_1$, $\phi_2$, and $\phi_3$, comprising signal $\phi_{ST}$ present at the output of accumulator 40 on leads 81, 82, and 83, respectively; the decimal equivalent value of signal $\phi_{ST}$, as comprised of the binary digits represented by signals $\phi_1$, $\phi_2$, and $\phi_3$ having a sawtooth waveform characteristic; signal $\phi_B$ present at output lead 94 of exclusive OR gate 99; the signals $\alpha_1$, $\alpha_2$, and $\alpha_3$ applied to register 34 from the respective outputs of exclusive OR logic gates 41, 42, and 43; and the decimal equivalent value of signal $\phi_T$, having triangular waveform characteristic, present at the output 102 of BPSK modulation device 31:

TABLE 1

| Time Points i | Input Signal Value (C = 1) | $\phi_{PC}$ State | Accumulator Output Signals | | | | $\phi_{ST}$ Value | $\phi_B$ Value | Exclusive OR Logic Gates Output Signals | | | $\phi_T$ Value |
|---|---|---|---|---|---|---|---|---|---|---|---|---|
| | | | Over-Flow $\phi_{OF}$ | $\phi_{ST}$ Signals Components | | | | | | | | |
| | | | | $\phi_3$ | $\phi_2$ | $\phi_1$ | | | $\alpha_3$ | $\alpha_2$ | $\alpha_1$ | |
| 0 | 1 | 0 | 0 | 0 | 0 | 0 | 0 | 0 | 0 | 0 | 0 | 0 |
| 1 | 1 | 0 | 0 | 0 | 0 | 1 | 1 | 0 | 0 | 0 | 1 | 1 |
| 2 | 1 | 0 | 0 | 0 | 1 | 0 | 2 | 0 | 0 | 1 | 0 | 2 |
| 3 | 1 | 0 | 0 | 0 | 1 | 1 | 3 | 0 | 0 | 1 | 1 | 3 |
| 4 | 1 | 0 | 0 | 1 | 0 | 0 | 4 | 0 | 1 | 0 | 0 | 4 |
| 5 | 1 | 0 | 0 | 1 | 0 | 1 | 5 | 0 | 1 | 0 | 1 | 5 |
| 6 | 1 | 0 | 0 | 1 | 1 | 0 | 6 | 0 | 1 | 1 | 0 | 6 |
| 7 | 1 | 0 | 0 | 1 | 1 | 1 | 7 | 0 | 1 | 1 | 1 | 7 |
| 8 | 1 | 0 | 1 | 0 | 0 | 0 | 0 | 1 | 1 | 1 | 1 | 7 |
| 9 | 1 | 0 | 1 | 0 | 0 | 1 | 1 | 1 | 1 | 1 | 0 | 6 |
| 10 | 1 | 0 | 1 | 0 | 1 | 0 | 2 | 1 | 1 | 0 | 1 | 5 |
| 11 | 1 | 0 | 1 | 0 | 1 | 1 | 3 | 1 | 1 | 0 | 0 | 4 |
| 12 | 1 | 0 | 1 | 1 | 0 | 0 | 4 | 1 | 0 | 1 | 1 | 3 |
| 13 | 1 | 0 | 1 | 1 | 0 | 1 | 5 | 1 | 0 | 1 | 0 | 2 |
| 14 | 1 | 0 | 1 | 1 | 1 | 0 | 6 | 1 | 0 | 0 | 1 | 1 |
| 15 | 1 | 0 | 1 | 1 | 1 | 1 | 7 | 1 | 0 | 0 | 0 | 0 |
| 16 | 1 | 0 | 0 | 0 | 0 | 0 | 0 | 0 | 0 | 0 | 0 | 0 |
| 17 | 1 | 0 | 0 | 0 | 0 | 1 | 1 | 0 | 0 | 0 | 1 | 1 |
| 18 | 1 | 0 | 0 | 0 | 1 | 0 | 2 | 0 | 0 | 1 | 0 | 2 |
| 19 | 1 | 0 | 0 | 0 | 1 | 1 | 3 | 0 | 0 | 1 | 1 | 3 |
| 20 | 1 | 0 | 0 | 1 | 0 | 0 | 4 | 0 | 1 | 0 | 0 | 4 |
| 21 | 1 | 0 | 0 | 1 | 0 | 1 | 5 | 0 | 1 | 0 | 1 | 5 |
| 22 | 1 | 0 | 0 | 1 | 1 | 0 | 6 | 0 | 1 | 1 | 0 | 6 |
| 23 | 1 | 0 | 0 | 1 | 1 | 1 | 7 | 0 | 1 | 1 | 1 | 7 |
| 24 | 1 | 0 | 1 | 0 | 0 | 0 | 0 | 1 | 1 | 1 | 1 | 7 |
| 25 | 1 | 0 | 1 | 0 | 0 | 1 | 1 | 1 | 1 | 1 | 0 | 6 |
| 26 | 1 | 0 | 1 | 0 | 1 | 0 | 2 | 1 | 1 | 0 | 1 | 5 |
| 27 | 1 | 0 | 1 | 0 | 1 | 1 | 3 | 1 | 1 | 0 | 0 | 4 |
| 28 | 1 | 0 | 1 | 1 | 0 | 0 | 4 | 1 | 0 | 1 | 1 | 3 |
| 29 | 1 | 0 | 1 | 1 | 0 | 1 | 5 | 1 | 0 | 1 | 0 | 2 |
| 30 | 1 | 0 | 1 | 1 | 1 | 0 | 6 | 1 | 0 | 0 | 1 | 1 |
| 31 | 1 | 0 | 1 | 1 | 1 | 1 | 7 | 1 | 0 | 0 | 0 | 0 |

SIGNAL VALUES FOR $\phi_{PC} = 0$

TABLE 2

| Time Points i | Input Signal Value (C = 1) | $\phi_{PC}$ State | Accumulator Output Signals | | | | $\phi_{ST}$ Value | $\phi_B$ Value | Exclusive OR Logic Gates Output Signals | | | $\phi_T$ Value |
|---|---|---|---|---|---|---|---|---|---|---|---|---|
| | | | Over-Flow $\phi_{OF}$ | $\phi_{ST}$ Signals Components | | | | | | | | |
| | | | | $\phi_3$ | $\phi_2$ | $\phi_1$ | | | $\alpha_3$ | $\alpha_2$ | $\alpha_1$ | |
| 0 | 1 | 1 | 0 | 0 | 0 | 0 | 0 | 1 | 1 | 1 | 1 | 7 |
| 1 | 1 | 1 | 0 | 0 | 0 | 1 | 1 | 1 | 1 | 1 | 0 | 6 |
| 2 | 1 | 1 | 0 | 0 | 1 | 0 | 2 | 1 | 1 | 0 | 1 | 5 |
| 3 | 1 | 1 | 0 | 0 | 1 | 1 | 3 | 1 | 1 | 0 | 0 | 4 |
| 4 | 1 | 1 | 0 | 1 | 0 | 0 | 4 | 1 | 0 | 1 | 1 | 3 |
| 5 | 1 | 1 | 0 | 1 | 0 | 1 | 5 | 1 | 0 | 1 | 0 | 2 |
| 6 | 1 | 1 | 0 | 1 | 1 | 0 | 6 | 1 | 0 | 0 | 1 | 1 |
| 7 | 1 | 1 | 0 | 1 | 1 | 1 | 7 | 1 | 0 | 0 | 0 | 0 |
| 8 | 1 | 1 | 1 | 0 | 0 | 0 | 0 | 0 | 0 | 0 | 0 | 0 |
| 9 | 1 | 1 | 1 | 0 | 0 | 1 | 1 | 0 | 0 | 0 | 1 | 1 |
| 10 | 1 | 1 | 1 | 0 | 1 | 0 | 2 | 0 | 0 | 1 | 0 | 2 |
| 11 | 1 | 1 | 1 | 0 | 1 | 1 | 3 | 0 | 0 | 1 | 1 | 3 |
| 12 | 1 | 1 | 1 | 1 | 0 | 0 | 4 | 0 | 1 | 0 | 0 | 4 |
| 13 | 1 | 1 | 1 | 1 | 0 | 1 | 5 | 0 | 1 | 0 | 1 | 5 |
| 14 | 1 | 1 | 1 | 1 | 1 | 0 | 6 | 0 | 1 | 1 | 0 | 6 |
| 15 | 1 | 1 | 1 | 1 | 1 | 1 | 7 | 0 | 1 | 1 | 1 | 7 |
| 16 | 1 | 1 | 0 | 0 | 0 | 0 | 0 | 1 | 1 | 1 | 1 | 7 |
| 17 | 1 | 1 | 0 | 0 | 0 | 1 | 1 | 1 | 1 | 1 | 0 | 6 |
| 18 | 1 | 1 | 0 | 0 | 1 | 0 | 2 | 1 | 1 | 0 | 1 | 5 |
| 19 | 1 | 1 | 0 | 0 | 1 | 1 | 3 | 1 | 1 | 0 | 0 | 4 |
| 20 | 1 | 1 | 0 | 1 | 0 | 0 | 4 | 1 | 0 | 1 | 1 | 3 |
| 21 | 1 | 1 | 0 | 1 | 0 | 1 | 5 | 1 | 0 | 1 | 0 | 2 |
| 22 | 1 | 1 | 0 | 1 | 1 | 0 | 6 | 1 | 0 | 0 | 1 | 1 |
| 23 | 1 | 1 | 0 | 1 | 1 | 1 | 7 | 1 | 0 | 0 | 0 | 0 |
| 24 | 1 | 1 | 1 | 0 | 0 | 0 | 0 | 0 | 0 | 0 | 0 | 0 |

TABLE 2-continued

| Time Points i | Input Signal Value ($C = 1$) | $\phi_{PC}$ State | Accumulator Output Signals | | | | $\phi_{ST}$ Value | $\phi_B$ Value | Exclusive OR Logic Gates Output Signals | | | $\phi_T$ Value |
|---|---|---|---|---|---|---|---|---|---|---|---|---|
| | | | Over-Flow $\phi_{OF}$ | $\phi_{ST}$ Signals Components | | | | | | | | |
| | | | | $\phi_3$ | $\phi_2$ | $\phi_1$ | | | $\alpha_3$ | $\alpha_2$ | $\alpha_1$ | |
| 25 | 1 | 1 | 1 | 0 | 0 | 1 | 1 | 0 | 0 | 0 | 1 | 1 |
| 26 | 1 | 1 | 1 | 0 | 1 | 0 | 2 | 0 | 0 | 1 | 0 | 2 |
| 27 | 1 | 1 | 1 | 0 | 1 | 1 | 3 | 0 | 0 | 1 | 1 | 3 |
| 28 | 1 | 1 | 1 | 1 | 0 | 0 | 4 | 0 | 1 | 0 | 0 | 4 |
| 29 | 1 | 1 | 1 | 1 | 0 | 1 | 5 | 0 | 1 | 0 | 1 | 5 |
| 30 | 1 | 1 | 1 | 1 | 1 | 0 | 6 | 0 | 1 | 1 | 0 | 6 |
| 31 | 1 | 1 | 1 | 1 | 1 | 1 | 7 | 0 | 1 | 1 | 1 | 7 |

SIGNAL VALUES FOR $\phi_{PC} = 1$

Figure 4:
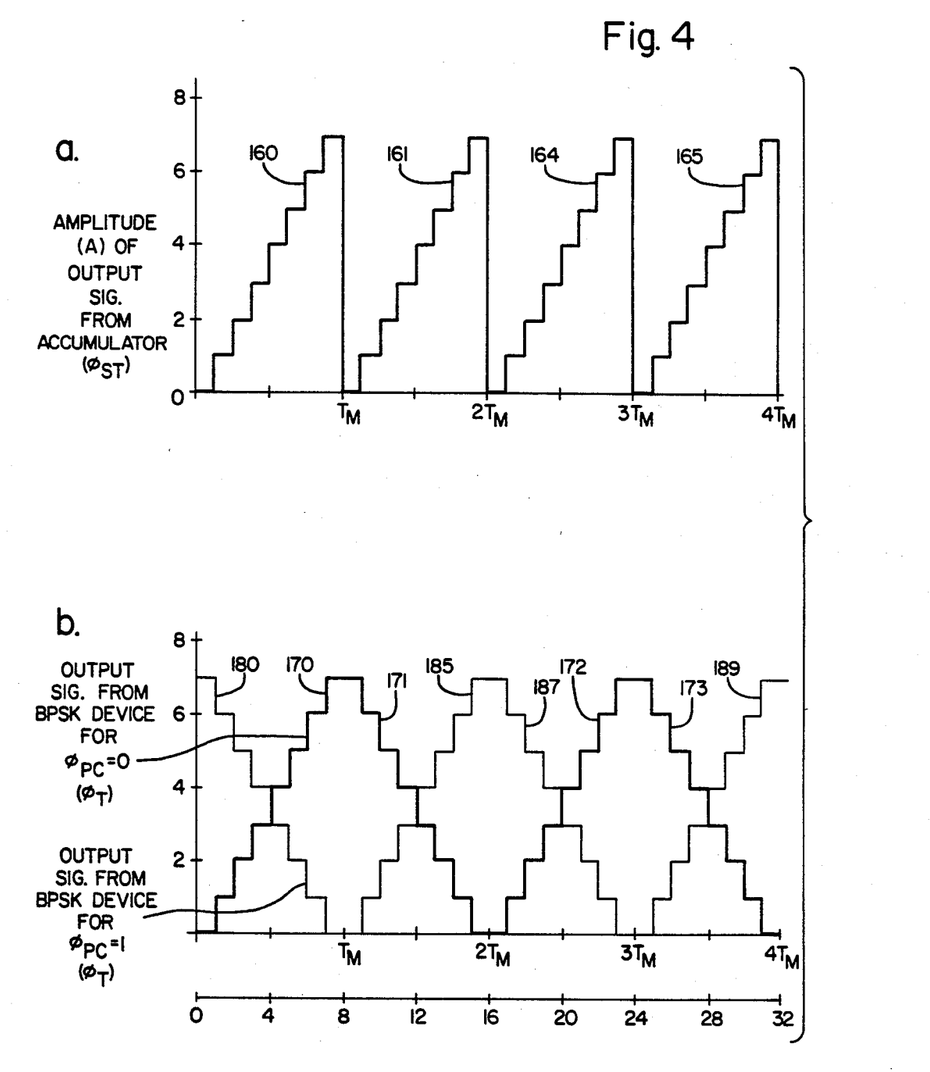
Figure 5:
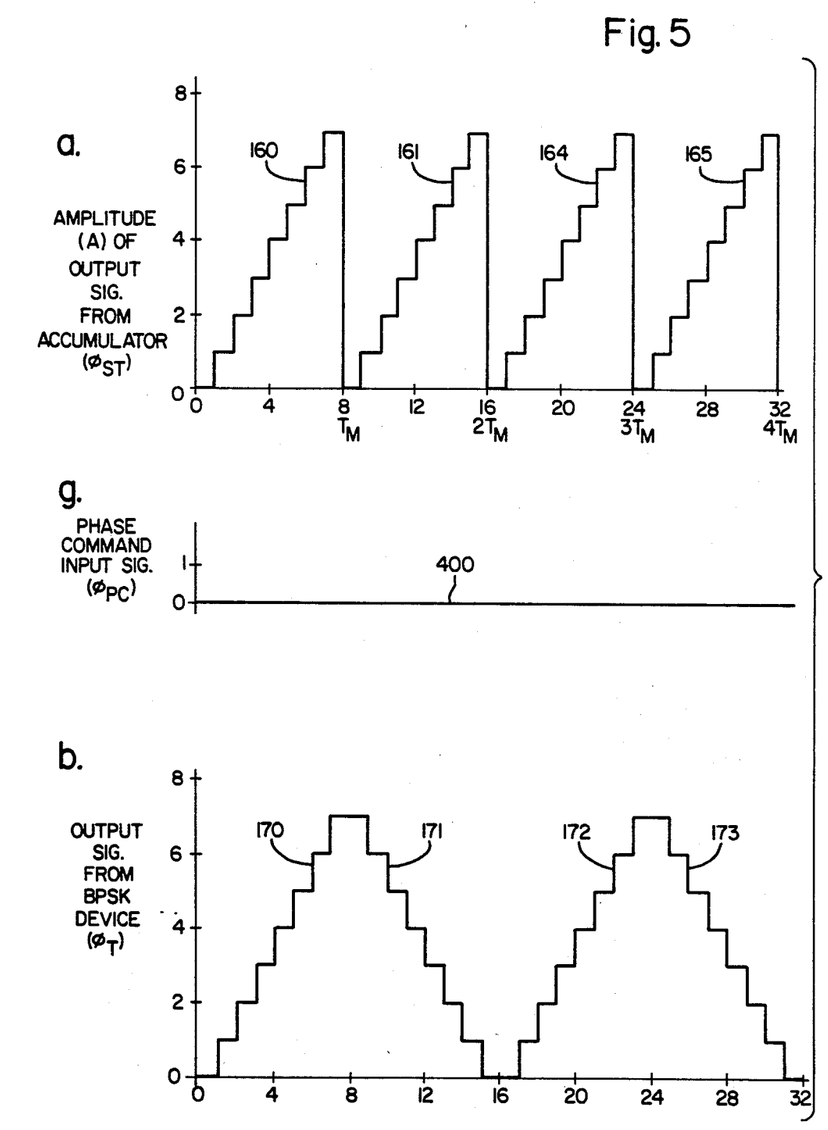
Figure 6:
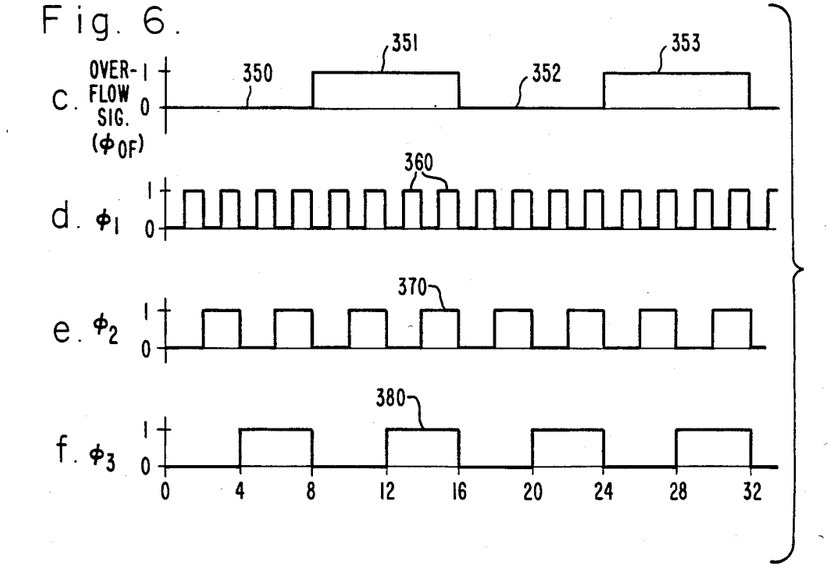
Figure 7A:
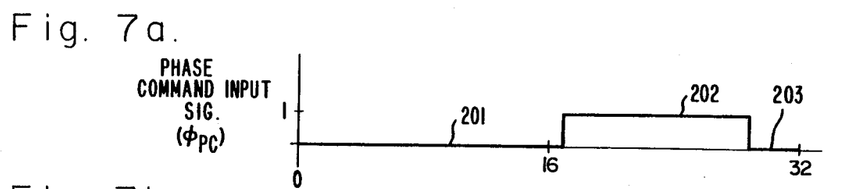
Figure 7B:
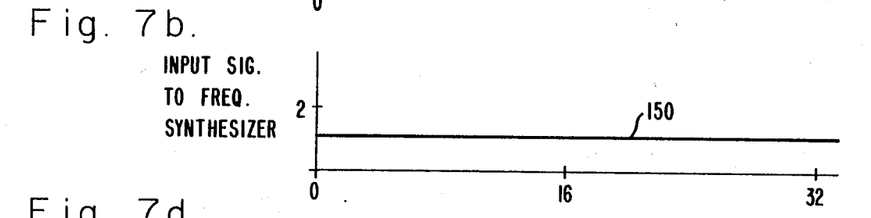
Figure 7C:
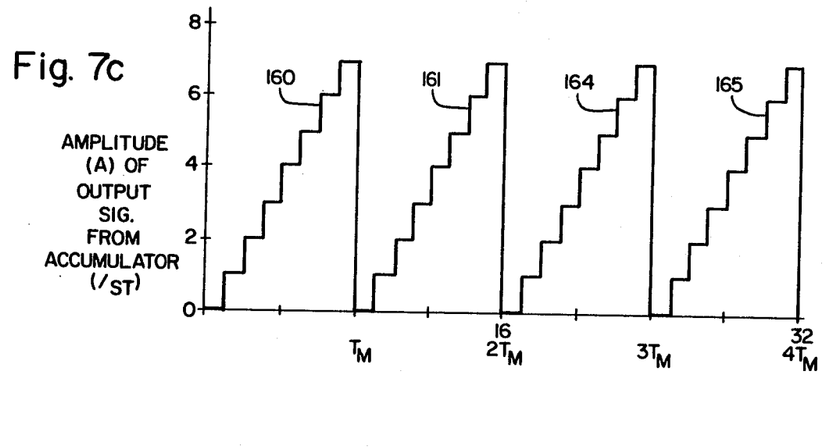
Figure 7D:
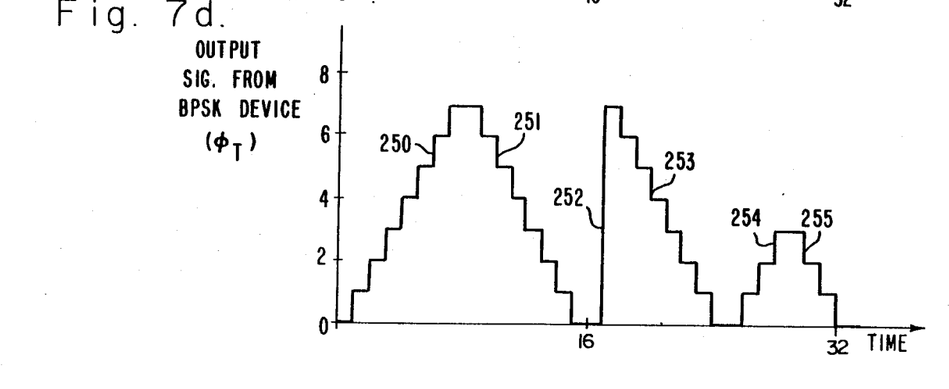
Figure 7E:
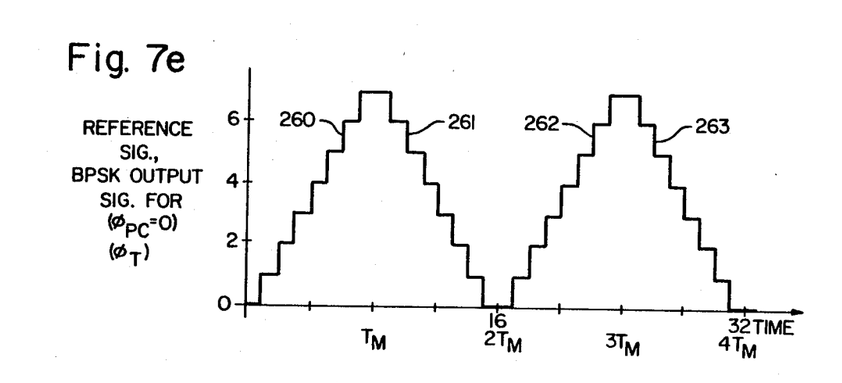

The use of exclusive OR logic gates 41, 42, and 43 in combination with exclusive OR logic gate 99, and the applied phase code command signal $\phi_{PC}$, which permits the phase angle modulation of the signal, as shown in FIG. 3, produces signal $\phi_T$ with triangular waveform characteristic, as depicted by waveform segments 170–173 and 180, 185, 187, and 189 in FIG. 4, waveform segments 170–173 in FIG. 5, waveform segments 196–199 in FIG. 6, and waveform segments 260–263 in FIG. 7.

Exclusive OR gates 41, 42, and 43, which receive the series of digital words comprising $\phi_{ST}$ appearing at the output of accumulator 40, and exclusive OR gate 99, which receives the phase code command signal $\phi_{PC}$, comprise a phase shifting means which develops a discrete shift in phase of signal $\phi_T$ at output 102. Whenever signal $\phi_{OF}$ remains constant and a transition occurs between phase code states of signal $\phi_{PC}$, signal $\phi_B$ introduces a change in the difference value C between a pair of adjacent words in the series of digital words of signal $\phi_{ST}$ appearing at the output of accumulator 40 during the transition. The resultant signals $\alpha_1$, $\alpha_2$, and $\alpha_3$ appearing at the respective outputs of exclusive OR logic gates 41, 42, and 43 represent a second series of digital words characterizing a signal having the same fundamental frequency as, but with a discrete shift in phase relative to, that of $\phi_{ST}$.

In the preferred embodiment of the present invention, whenever signal $\phi_{OF}$ has a logic value of "zero" and the phase code state of signal $\phi_B$ becomes a logic "one," or signal $\phi_{OF}$ has a logic value of "one" and phase code state of signal $\phi_B$ becomes a logic "zero," a one's complement logic operation is performed by means of exclusive OR gates 41, 42, and 43 on the digital words of signal $\phi_{ST}$ to provide a 180° relative shift in phase of signal $\phi_T$. Whenever signal $\phi_{OF}$ has a logic value of "zero" and the phase code state of signal $\phi_B$ becomes a logic "zero," or signal $\phi_{OF}$ has a logic value of "one" and the phase code state of signal $\phi_B$ becomes a logic "one", the one's complement logic operation is terminated by means of exclusive OR gates 41, 42, and 43 on the digital words of signal $\phi_{ST}$ to provide a 180° relative shift in phase of signal $\phi_T$.

In the event both signals $\phi_{PC}$ and $\phi_{OF}$ undergo coincident changes in logic states, signal $\phi_B$ does not change its logic state. The difference value between a pair of adjacent digital words of signal $\phi_{ST}$ appearing at the output of accumulator 40 during the transition, therefore, does not change. The transition between phase code states, however, does cause a 180° relative shift in phase of signal $\phi_T$. The difference value between a pair of adjacent words in the series of words comprising $\phi_{ST}$, therefore, changes by an amount required to provide a discrete relative shift in phase of signal $\phi_T$. The required amount is established by the contents of accumulator 40 and the presence of a transition of signal $\phi_{OF}$ during the transition between phase code states.

With reference to FIG. 5, whenever in operation the applied phase code command signal $\phi_{PC}$ is set to the "zero" state as represented by waveform 400, and overflow signal $\phi_{OF}$ has a value of "zero" as represented by waveform segment 301, waveform segment 170 associated with signal $\phi_T$ is produced at the outputs of exclusive OR logic gates 41, 42, and 43 by the signals $\phi_B$, $\phi_1$, $\phi_2$, and $\phi_3$ which are applied to the inputs of exclusive OR logic gates 41, 42, and 43 as indicated in FIG. 3.

Figure 8:
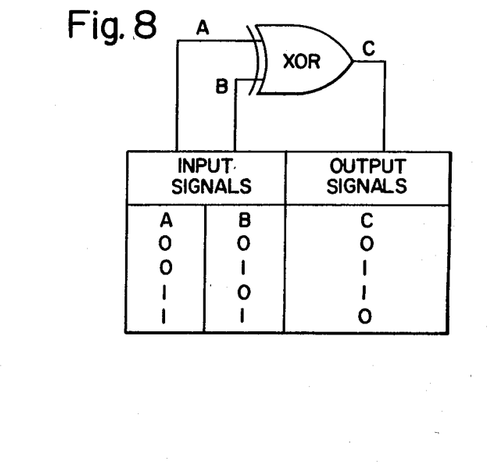
FIG. 8 is a diagram which describes and defines the exclusive OR logic gate used in the present invention.

The waveform characteristics of signals $\phi_1$, $\phi_2$, and $\phi_3$ which are associated with waveform segment 171 of signal $\phi_T$ are also depicted in FIG. 5. Whenever phase code command signal $\phi_{PC}$ is set to the "zero" state and overflow signal $\phi_{OF}$ has a value of "one" as represented by waveform segment 302, waveform segment 171 associated with signal $\phi_T$ is produced at the outputs of exclusive OR logic gates 41, 42, and 43. During a counting cycle, signal $\phi_{OF}$ takes on a value of "one" whenever register 33 having N+1 stages exceeds a value of $2^N - 1$, which is seven for the present embodiment of the invention. The output signal $\phi_B$ represents the output states of exclusive OR logic gate 99, which states are given in Table 1 and are determined by the logic states of its input signals $\phi_{OF}$ and $\phi_{PC}$. The truth table for an exclusive OR logic gate is set forth in FIG. 8. Signal $\phi_B$ appears at the output of exclusive OR logic gate 99 and is applied to input terminals 61, 62, and 63 of exclusive OR logic gates 41, 42, and 43, respectively.

Signal components $\phi_1$, $\phi_2$, and $\phi_3$ comprising signal $\phi_{ST}$ are coupled to exclusive OR logic gates 41, 42, and 43 on respective input terminals 71, 72, and 73 and are associated with the respective waveforms 310, 320, and 330 of FIG. 5. As defined in FIG. 8, whenever overflow signal $\phi_{OF}$ has a value of "one" and signal $\phi_{PC}$ has a value of "zero," the values of the other signals $\phi_1$, $\phi_2$, and $\phi_3$ applied to exclusive OR logic gates 41, 42, and 43 are complemented, thereby producing signals $\alpha_1$, $\alpha_2$, and $\alpha_3$, respectively. A binary signal value is complemented when it changes from a value of "one" to a value of "zero," or vice versa. Consequently, waveform segment 171 associated with signal $\phi_T$, which is comprised of component signals $\alpha_1$, $\alpha_2$, and $\alpha_3$, decreases in value from a maximum value of $2^M - 1$, which is seven in the present embodiment of the invention, to a value of zero. These series of values for the above-described signals depicted in FIG. 5 are presented in Table 1 for two cycles ($4T_M$) of the output signal $\phi_T$.

With reference to FIG. 6, whenever in operation the applied phase code command signal $\phi_{PC}$ is set to the "one" state as represented by waveform 401, and overflow signal $\phi_{OF}$ has a value of "zero" as represented by waveform segment 350, waveform segment 196 associated with signal $\phi_T$ is produced at the outputs of exclusive OR logic gates 41, 42, and 43 by the signals $\phi_B$, $\phi_1$, $\phi_2$, and $\phi_3$ applied to the inputs of exclusive OR logic gates 41, 42, and 43 as indicated in FIG. 3.

The waveform characteristics of signals $\phi_1$, $\phi_2$, and $\phi_3$ which are associated with waveform segment 197 of signal $\phi_T$ are also depicted in FIG. 6. Whenever phase code command signal $\phi_{PC}$ is set to the "one" state and overflow signal $\phi_{OF}$ has a value of "one" as represented by waveform segment 351, waveform segment 197 associated with signal $\phi_T$ is produced at the outputs of exclusive OR logic gates 41, 42, and 43. During a counting cycle, signal $\phi_{OF}$ takes on a value of one whenever register 33 having N+1 stages exceeds a value of $2^N - 1$, which is seven for the present embodiment of the invention. The values of the output signal $\phi_B$ from exclusive OR logic gate 99 are given in Table 2, as defined in FIG. 8. Signal $\phi_B$ appears at the output of exclusive OR logic gate 99 and is applied to input terminals 61, 62, and 63 of exclusive OR logic gates 41, 42, and 43, respectively.

Signal components $\phi_1$, $\phi_2$, and $\phi_3$ comprising signal $\phi_{ST}$ are coupled to exclusive OR logic gates 41, 42, and 43 on respective terminals 71, 72, and 73 and are associated with the respective waveforms 360, 370, and 380 of FIG. 6. As defined in FIG. 8, whenever overflow signal $\phi_{OF}$ and signal $\phi_{PC}$ have a values of "one," the output signal values of the signals $\alpha_1$, $\alpha_2$, and $\alpha_3$ are not complemented. Consequently, waveform segment 197, associated with signal $\phi_T$, which is comprised of component signals $\alpha_1$, $\alpha_2$, and $\alpha_3$ increases in value from a minimum value of zero to a maximum value of $2^M - 1$, which is seven in the present embodiment of the invention. These series of values for the above-described signals depicted in FIG. 6 are presented in Table 2 for two cycles (4T) of the output signal $\phi_T$.

The bi-phase signal characteristic of the present invention is depicted in FIG. 4. A first waveform which is comprised of waveform segments 180, 185, 187, and 189 is associated with the output signal $\phi_T$ from the BPSK modulation device for the phase code signal $\phi_{PC}$ in the "one" state. A second waveform which is comprised of waveform segments 170, 171, 172, and 173 is associated with the output signal $\phi_T$ from BPSK modulation device for the phase code signal $\phi_{PC}$ in the "zero" state. The first and second waveforms as defined hereinabove are phase reversed, i.e., shifted in phase by 180° relative to each other.

The bi-phase signal characteristic of the present invention is depicted in further detail in FIG. 7, which indicates the relationship between the signal $\phi_{ST}$ with a sawtooth waveform characteristic and signal $\phi_T$ with a triangular waveform characteristic. The waveform of the BPSK output signal $\phi_T$ as phase-controlled by the $\phi_{PC}$ input signal is also depicted in FIG. 7. (The transitions between phase code states of signal $\phi_{PC}$ are shown to occur in synchronism with the changes in amplitude of signal $\phi_{ST}$ for the purpose of clarity. In general, such synchronism may not exist.) The phase reversal characteristic of the output signal $\phi_T$ is demonstrated by designating as a phase reference the phase of the BPSK modulator output signal $\phi_T$ for signal $\phi_{PC}$ set in the "zero" phase code state, with value zero.

With reference to FIG. 7, waveform segment 201 indicates a condition wherein signal $\phi_{PC}$ is set in the "zero" phase code state, with value zero, so that for the duration of said condition, signal $\phi_T$ is in-phase with the reference signal (BPSK modulator output signal for $\phi_{PC}=0$) and that waveform segments 250, 251, and 252 have the same slope as the respective waveform segments 260, 261, and the initial part of waveform segment 262. Waveform segment 202 indicates a condition wherein signal $\phi_{PC}$ is set in the "one" phase code state, with value one, so that for the duration of said condition, $\phi_T$ signal is 180° out-of-phase, i.e., phase reversed, relative to the reference signal (BPSK modulator output signal for $\phi_{PC}=0$) and that waveform segment 253 has the opposite slope as the terminal part of waveform segment 262 and waveform segment 254 has the opposite slope as the initial part of waveform segment 263. A similar pattern continues for the phase relationship of the BPSK modulator output signal $\phi_T$ relative to the reference signal as the state of the phase code command signal is altered from the "one" state to the "zero" state, as is depicted in FIG. 7 by waveform segment 203.

In the manner described, the phase characteristic of the output signal $\phi_T$ from the BPSK modulator device is altered by 180°, or phase reversed, with the use of the phase code command signal $\phi_{PC}$, as depicted by waveform segments 250-255 of signal $\phi_T$ in reference to waveform segments 260-263 of the reference signal.

To those skilled in the art, it should be apparent that the implementation of the above-described embodiment could be varied without departing from the scope of the invention. In all cases it is understood that the above-described embodiments are merely illustrative of but a small number of the many possible specific embodiments which represent the application of the principles of the present invention. Furthermore, numerous and varied other arrangements can be readily devised in accordance with the principles of the present invention of those skilled in the art without departing from the spirit and scope of the invention. For example, the size of the accumulator and the specific number of exclusive OR gates can be altered so as to modify the resolution of the BPSK device output signal. Moreover, the value of the offset applied to the difference value between adjacent words appearing at the accumulator output during the transition between phase code states can be set to provide a shift in phase of other than 180° of the synthesizer output signal.

What is claimed is:

1. A digital circuit for providing a carrier signal which is phase modulated between discrete phase states in accordance with an applied phase code command signal, comprising:

a digital accumulator which provides at its output a first series of digital words corresponding to a carrier signal in a first phase state, and adjacent words in the first series have a difference value which corresponds to the fundamental frequency of the carrier signal; and phase shifting means in communication with the accumulator, the phase shifting means being responsive to transitions between discrete phase code states of the phase code command signal to provide a second series of digital words corresponding to the carrier signal in a second phase state, the phase shifting means introducing an offset to the difference value between a pair of adjacent words in the first series to develop the second series of digital words and thereby provide a discrete relative shift in phase of the carrier signal.

2. The circuit of claim 1 in which the offset is introduced by the phase shifting means which performs a one's complement logic operation on a word appearing at the output of the accumulator, thereby to provide a 180° relative shift in phase of the carrier signal.

3. The circuit of claim 2 in which the one's complement logic operation is performed by a transition between phase code states of the phase code command signal.

4. The circuit of claim 1 in which the output of the accumulator includes a plurality of parallel output conductors of which each one represents a bit position of the words in the first series of digital words and the phase shifting means includes a first plurality of exclusive OR logic gates, a first input of each exclusive OR gate being electrically connected to a signal derived from the phase code command signal and a second input of each exclusive OR gate being electrically connected to a different one of the output conductors of the output of the accumulator, thereby to introduce in accordance with the phase code command signal a 180° relative shift in phase of the carrier signal.

5. The circuit of claim 4 in which the accumulator produces an overflow signal, the overflow signal and the phase code command signal being electrically connected to different inputs of a second exclusive OR gate, and the output of the second exclusive OR gate being electrically connected to the first input of each exclusive OR gate of the first plurality of exclusive OR gates, thereby to develop the carrier signal in a triangular waveform.

6. A digital circuit for providing a carrier signal which is phase modulated between discrete phase states in accordance with an applied phase code command signal, comprising:
   a digital accumulator including input means for receiving a digital input word and clocking means for receiving a clock signal, the accumulator providing at its output a first series of digital words in which adjacent words have a difference value corresponding to the fundamental frequency of the carrier signal in a first phase state, the operation of the accumulator being characterized as the successive accumulation to the contents thereof in increments of digital word information corresponding to the input word, the successive accumulation being accomplished at a rate relating to the frequency of the clock signal to produce at the output of the accumulator the first series of digital words; and
   phase shifting means in communication with the accumulator, the phase shifting means being responsive to transitions between discrete phase code states of the phase code command signal to provide a second series of digital words corresponding to the carrier signal in a second phase state, the phase shifting means introducing an offset to the difference value between a pair of adjacent words in the first series to develop the second series of digital words and thereby provide a discrete relative shift in phase of the carrier signal.

7. In a digital frequency synthesizer comprising an accumulator which responds to a frequency selection digital word applied to an input thereof to develop at its output a stream of digital words in a series whose adjacent words differ by a value which characterizes a first signal waveform having a fundamental frequency of oscillation corresponding to the frequency selection word, a method for phase modulating the signal between discrete phase states, comprising:
   applying to the digital frequency synthesizer a phase code command signal having first and second phase code states; and
   changing in response to each transition between the phase code states of the phase code command signal the difference value between a pair of adjacent words in the series of digital words by an amount required to provide a second signal waveform having the same fundamental frequency as, but with a discrete shift in phase relative to, the first signal waveform.

8. The method of claim 7 in which the change in difference value is accomplished by performing a one's complement logic operation on a digital word appearing at the output of the accumulator, thereby to provide a 180° relative shift in phase.

9. The method of claim 8 in which the one's complement logic operation is performed by a transition between phase code states of the phase code command signal.

10. The method of claim 7 in which the accumulator output comprises a plurality of parallel conductors of which each corresponds to a bit position of the digital words in the series and is electrically connected to a first input of a different one of a group of exclusive OR gates, and a signal derived from the phase code command signal being applied to a second input of each one of the exclusive OR gates to change by 180° the relative phase between the first and second signal waveforms in response to the transitions between the phase code states.

* * * * *

UNITED STATES PATENT AND TRADEMARK OFFICE
CERTIFICATE OF CORRECTION

PATENT NO. : 4,580,277
DATED : April 1, 1986
INVENTOR(S) : P. S. ANGELLO et al.

It is certified that error appears in the above-identified patent and that said Letters Patent is hereby corrected as shown below:

Title page:

The designated assignee is HUGHES AIRCRAFT COMPANY.

The appointed attorneys of record are S. C. Durant, M. J. Meltzer and A. W. Karambelas.

Signed and Sealed this

Nineteenth Day of December, 1989

Attest:

JEFFREY M. SAMUELS

*Attesting Officer*         *Acting Commissioner of Patents and Trademarks*